United States Patent
Jenkins

(10) Patent No.: US 7,666,302 B2
(45) Date of Patent: Feb. 23, 2010

(54) DUAL CELL NITROGEN REMOVAL APPARATUS

(76) Inventor: David W Jenkins, 150 Herron's Run Dr., Apt. 112, Sarasota, FL (US) 34232

( * ) Notice: Subject to any disclaimer, the term of this patent is extended or adjusted under 35 U.S.C. 154(b) by 32 days.

(21) Appl. No.: 12/217,561

(22) Filed: Jul. 7, 2008

(65) Prior Publication Data

US 2010/0000921 A1 Jan. 7, 2010

(51) Int. Cl.
*C02F 3/30* (2006.01)
(52) U.S. Cl. ............. 210/150; 210/170.05; 210/170.09; 210/253; 210/903
(58) Field of Classification Search ................. 210/150, 210/151, 170.05, 170.09, 170.1, 170.11, 210/253, 616, 617, 903
See application file for complete search history.

(56) References Cited

U.S. PATENT DOCUMENTS

| | | | | |
|---|---|---|---|---|
| 3,563,888 A | * | 2/1971 | Klock | 210/617 |
| 4,008,159 A | * | 2/1977 | Besik | 210/151 |
| 4,179,374 A | * | 12/1979 | Savage et al. | 210/151 |
| 5,087,353 A | | 2/1992 | Todd et al. | |
| 5,228,998 A | | 7/1993 | DiClemente et al. | |
| 5,507,950 A | | 4/1996 | Senda et al. | |
| 5,618,413 A | * | 4/1997 | Todd et al. | 210/151 |
| 5,705,057 A | * | 1/1998 | Hoffa | 210/150 |
| 5,795,481 A | * | 8/1998 | Lesouef | 210/150 |
| 5,863,433 A | | 1/1999 | Behrends | |
| 6,039,866 A | | 3/2000 | Tanaka et al. | |
| 6,139,745 A | | 10/2000 | Mizumori et al. | |
| 6,159,364 A | * | 12/2000 | Hirane | 210/150 |
| 6,207,047 B1 | * | 3/2001 | Gothreaux | 210/150 |
| 6,231,766 B1 | | 5/2001 | Hausin | |
| 6,348,147 B1 | | 2/2002 | Long | |
| 6,531,058 B1 | * | 3/2003 | Josse et al. | 210/151 |
| 7,022,233 B2 | * | 4/2006 | Chen | 210/151 |
| 7,101,483 B2 | | 9/2006 | Volker et al. | |
| 7,344,644 B2 | | 3/2008 | Haudenschild | |
| 2007/0095750 A1 | * | 5/2007 | Lin et al. | 210/150 |
| 2008/0053897 A1 | * | 3/2008 | Zhu et al. | 210/151 |

* cited by examiner

*Primary Examiner*—Christopher Upton
(74) *Attorney, Agent, or Firm*—Charles J. Prescott

(57) ABSTRACT

A water treatment apparatus including a series of pairs of water filtration cells of an upwelling type. Each cell of each pair has a longitudinally extending water conduit in fluid communication between an upper and a lower end of each cell. The first cell of each pair is a fluidized bed type containing a biologically active media, the water entering a bottom of this cell upwelling through the biologically active media to discharge from a discharge port at or near the top of the first cell. The second cell of each pair has the upper end of its water conduit in fluid communication with the discharge port of the paired first cell and contains media which removes nitrates from the water entering and upwelling through the nitrate removing media for discharge from the second cell.

24 Claims, 5 Drawing Sheets

DUAL CELL NITROGEN REMOVAL APPARATUS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to fluidized bed filtering apparatus for treating non-potable water, and more particularly to such an apparatus for improving the water quality of lakes and ponds by reducing nitrogen content.

2. Description of Related Art

Treating lakes and ponds, especially those manmade for collection of rainwater runoff, is an important ecological function. The use of fluidized bed filtering apparatus is known in prior art as a technique for purifying corrupt water. One such patent in U.S. Pat. No. 6,039,866 invented by Tanaka et al. teaches such a fluidized bed filtering apparatus designed to prevent clogging thereof while treating wastewater.

U.S. Pat. No. 5,087,353 to Todd et al. teaches a solar apparatus for removing pollutants from various types of wastewater, using biologically active organisms and without using chemicals and without producing large quantities of sludge containing pollutants.

A floating apparatus for the biological treatment of polluted waters and, more particularly, to the consumption of undesirable biodegradable materials in ponds, lagoons, streams, or other similar waters is disclosed in U.S. Pat. No. 5,228,998 to DiClemente et al.

Senda et al. discloses a method of purifying polluted water using a floating water purification device in U.S. Pat. No. 5,507,950. U.S. Pat. No. 5,863,433 to Behrends teaches paired subsurface flow constructed wetlands for improving wastewater treatment.

A fluidized bed sewage system for enabling the purification of lake and pond waters is disclosed in U.S. Pat. No. 6,139,745 to Mizumori et al. Hausin teaches a process for purifying water in which the water is contacted with biological microorganisms disposed on a plurality of bio-suspension elements in U.S. Pat. No. 6,231,766.

U.S. Pat. No. 6,348,147 to Long discloses an improved fluid flow system for a floating biological contactor making it more efficient in sustaining growth of a large bacterial colony and less expensive to operate and maintain. An improved process for treating a body of water using both a water eductor and a bioreactor in which the water is contacted with biological microorganisms disposed on a plurality of bio-suspension elements is taught by Volker et al. in U.S. Pat. No. 7,101,483. Haudenschild discloses a method and system of water purification by burying an underdrain in situ under a filter media bed such as a particulate material bed within a natural body of water and pumping the water from the underdrain at a sufficient rate to cause a complex biological matrix filter to proliferate on top of the filter media bed forming a portion of the floor of the body of water in U.S. Pat. No. 7,344,644.

The present invention utilizes a series (acting in parallel) of dual upwelling cells, the first of which is a fluidized bed type, either floating or submersible, to reduce ammonia, nitrite and nitrate content of lake and pond water. Additional bed components may be added to increase dissolved oxygen levels, clarify the water, kill bacteria and viruses, and reduce heavy metals and toxic chemicals content.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a water treatment apparatus including a series of pairs of water filtration cells of an upwelling type. Each cell of each pair has a longitudinally extending water conduit in fluid communication between an upper and a lower end of each cell. The first cell of each pair is a fluidized bed type containing a biologically active media, the water entering a bottom of this cell upwelling through the biologically active media to discharge from a discharge port at or near the top of this first cell. The second cell of each pair has the upper end of its water conduit in fluid communication with the discharge port of the paired first cell and contains media which removes nitrates from the water entering and upwelling through the nitrate removing media for discharge from the second cell. A pump moves the water under pressure through the system.

It is therefore an object of this invention to provide a water treatment apparatus which may be deployed for denitrification of water in the lake or pond.

Still another object of this invention is to provide a denitrification apparatus which may be deployed in a lake or pond, either floating, submerged partially, or at the bottom of the pond.

Yet another object of this invention is to provide a dual-cell water treatment apparatus which both reduces nitrates in pond or lake water and buffers the water while also reducing the biological microbial content thereof.

Still another object of this invention is to provide a dual-cell water treatment apparatus for nitrogen removal from pond or lake water while also remaining substantially maintenance free for longer periods of operation, even when totally submerged within the pond or lake.

And another object of this invention is to provide a water treatment apparatus for reducing nitrogen content of pond and lake water while also being incorporated into a fountain or aeration system.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

Exemplary embodiments are illustrated in reference figures of the drawings. It is intended that the embodiments and figures disclosed herein are to be considered to be illustrative rather than limiting.

DETAILED DESCRIPTION OF THE INVENTION

Figure 1:
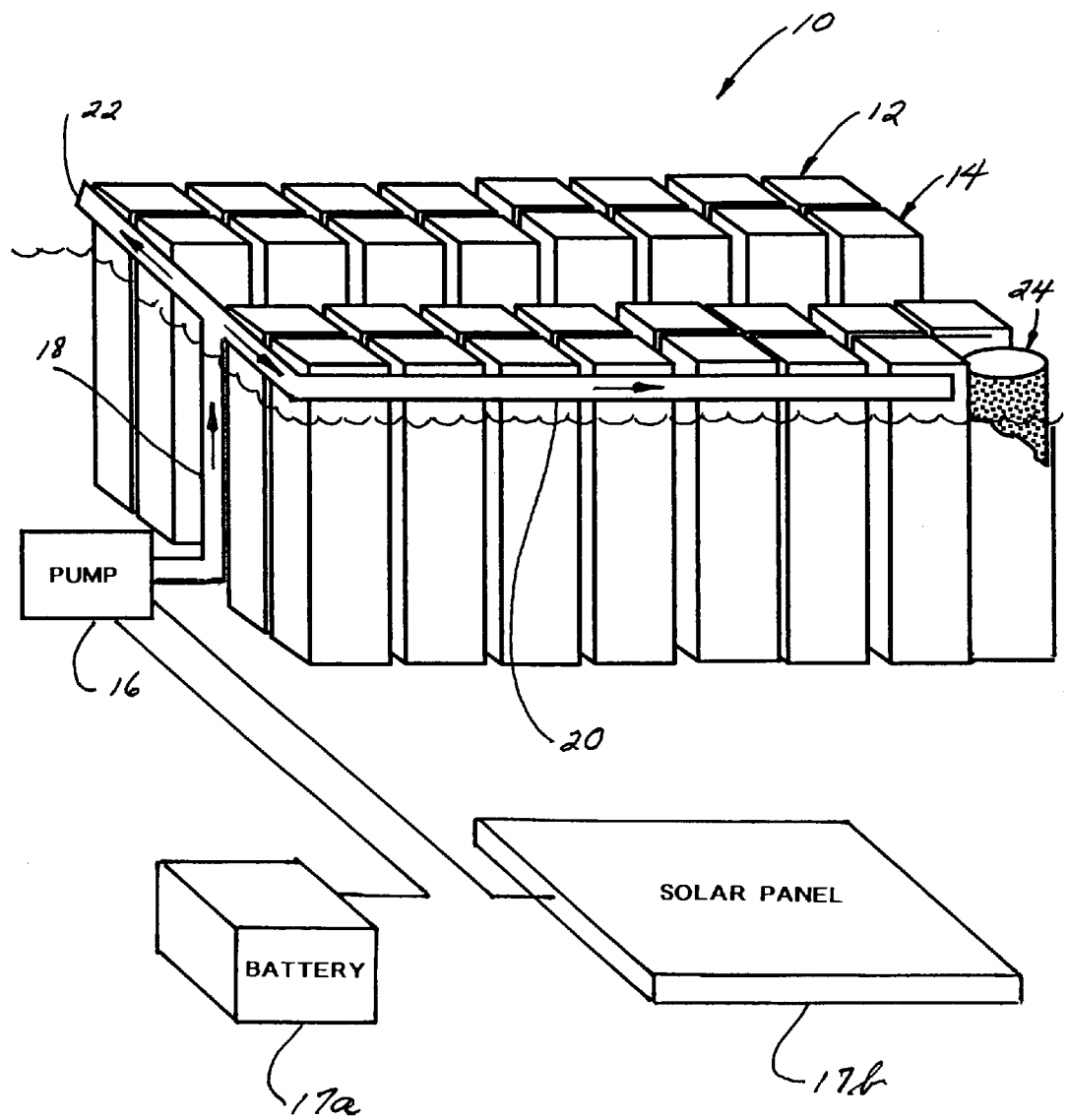
FIG. 1 is a perspective view of the preferred embodiment of the invention showing two alternate power sources for the pump.
Figure 2:
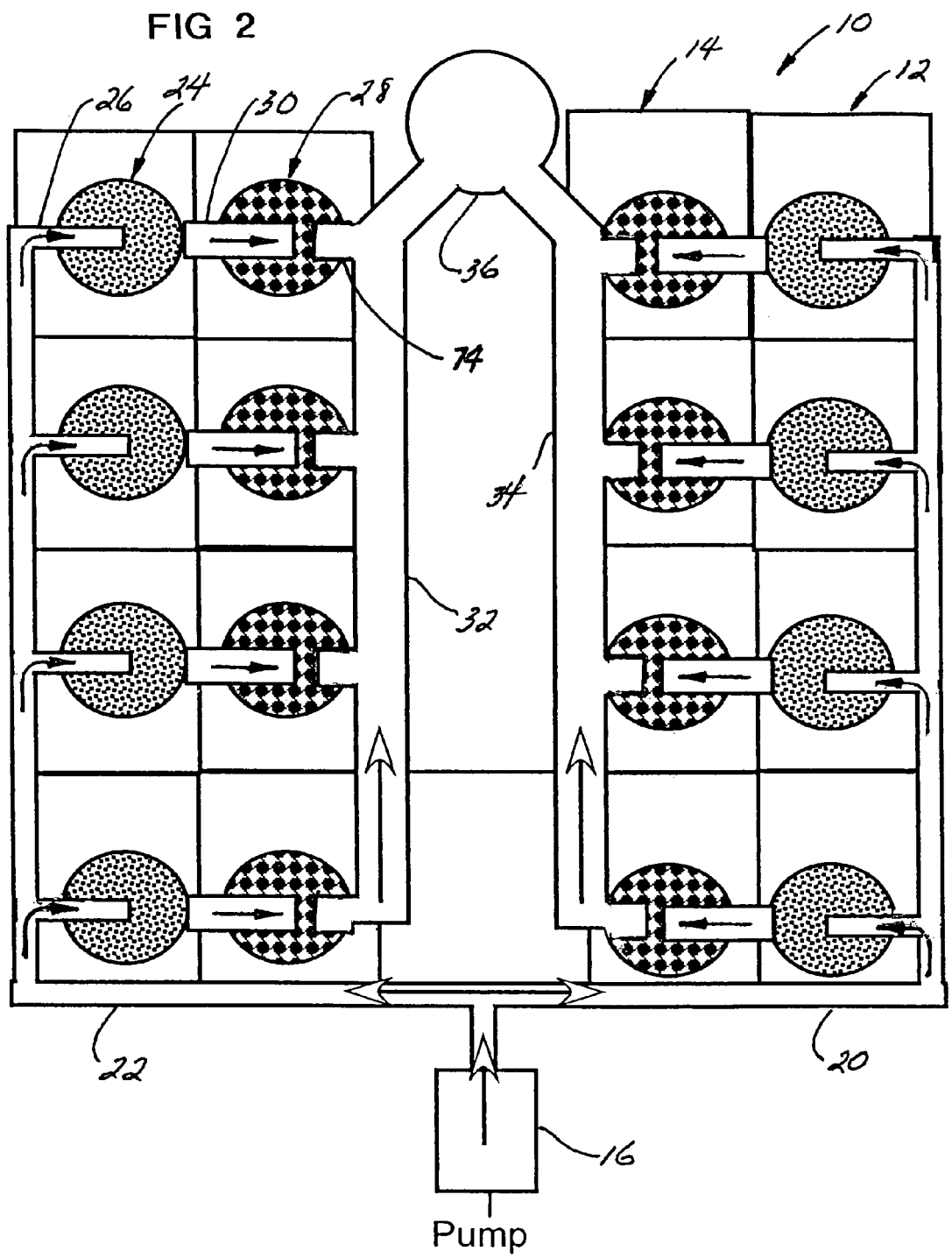
FIG. 2 is a top plan schematic view of FIG. 1.

Referring now to the drawings, and firstly to FIGS. 1 and 2, the preferred embodiment of the invention is there shown generally at numeral 10. This water treatment apparatus 10 is shown preferably as possessing buoyant characteristics described herebelow so that at least a portion of the apparatus 10 floats above the level of the water in a lake or pond to be treated. Two alternate embodiments for power source are shown in FIG. 1 as being either a storage battery and/or a solar panel or the combination of both which may be supported by the apparatus 10 and its flotation means or, alternately, supported atop the water by independent buoyancy or other mechanical means. Another power source (not shown) may be from municipal electric power or a wind generator. Either of these power supplies provides electric power for a pump 16 which forces water under pressure upwardly through up flow conduit 18 and then into manifolds 20 and 22.

The apparatus further includes a series of pairs of upwelling-type cells 14 and 24 which act in series. Each of the pairs of cells 14/24 are held within watertight containers 12 and 14, respectively, and act in parallel to treat inflowing water for nitrogen removal therefrom before being discharged back into the lake or pond. As best seen in FIG. 2, the manifolds 20 and 22 distribute water into each of the fluidized bed cells 24 and then, after being processed therewithin, the water flows through a transfer tube 30 into the denitrification cell 28. After the upwelling processing through each of the denitrification cells 28, the treated water then flows out of the apparatus 10 through collection conduits 32 and 34 and then preferably into an aerator 36 for discharge back into the pond or lake.

Figure 3:
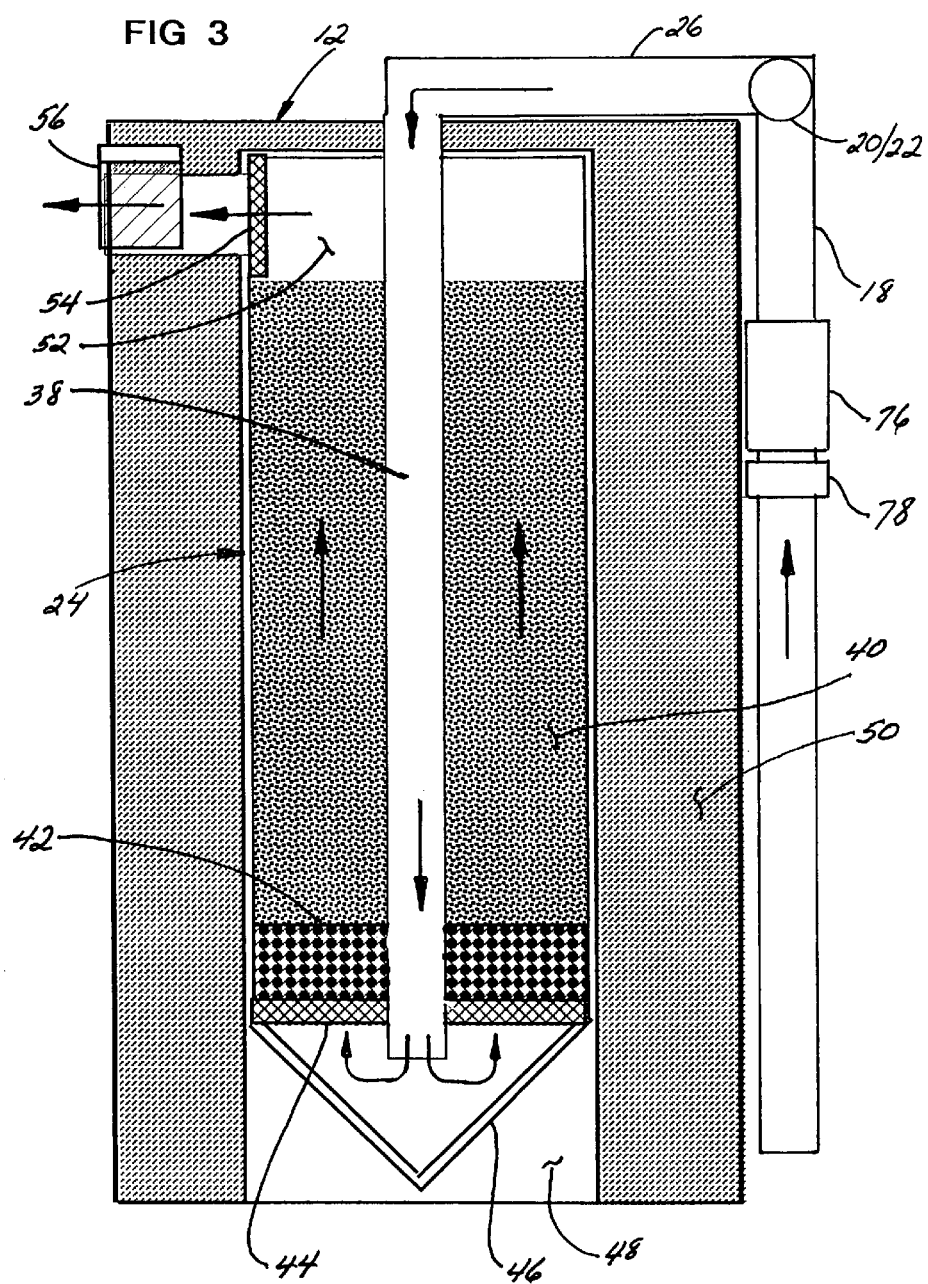
FIG. 3 is a longitudinal sectional view of the fluidized bed cell of FIG. 1.

Referring now to FIG. 3, each of the fluidized bed cells 24 receives water through a water delivery conduit 26 from one of the headers 20 or 22. The upflow conduit 18 includes a check valve 76 for preventing water and media backflow down into the pump from the apparatus 10 and also includes a junction union 78 which facilitates plumbing assembly and disassembly.

The water is fed into an upright central downflow water conduit 38 which extends downwardly through the center of each of the cells 24. The water is then upturned from a bottom deflector 46 which defines a cavity or void 48 at the very bottom of the cell 24. The water then flows upwardly through a calcium carbonate particles bed 42 which is supported on screen 44 and prevented from downward movement. The calcium carbonate particles act as a buffer to adjust the pH of the incoming water to facilitate and enhance the denitrification process described herebelow.

The water then upflows through a fluidized bed of biologically active media 40. The purpose of the fluidized bed arrangement is to lift and separate these biologically active particles 40 so that the water flows entirely around all of the particles to enhance the biological activity which occurs between the bacterial growth in the water and the media 40. This media 40 may move upwardly into cavity 52, but is prevented from flowing out of the cells 24 by a screen 54. Maximum flow through the cell 24 is regulated by a valve 56, each of which is easily adjustable.

Within each of the cell containers 12 a surrounding STYRAFOAM flotation layer 50 surrounds the cell 24 which renders the cell containers 12 buoyant in water. As previously stated, the preferred embodiment preferably floats atop water to more efficiently facilitate aeration on return of the water to the lake or pond.

Figure 4:
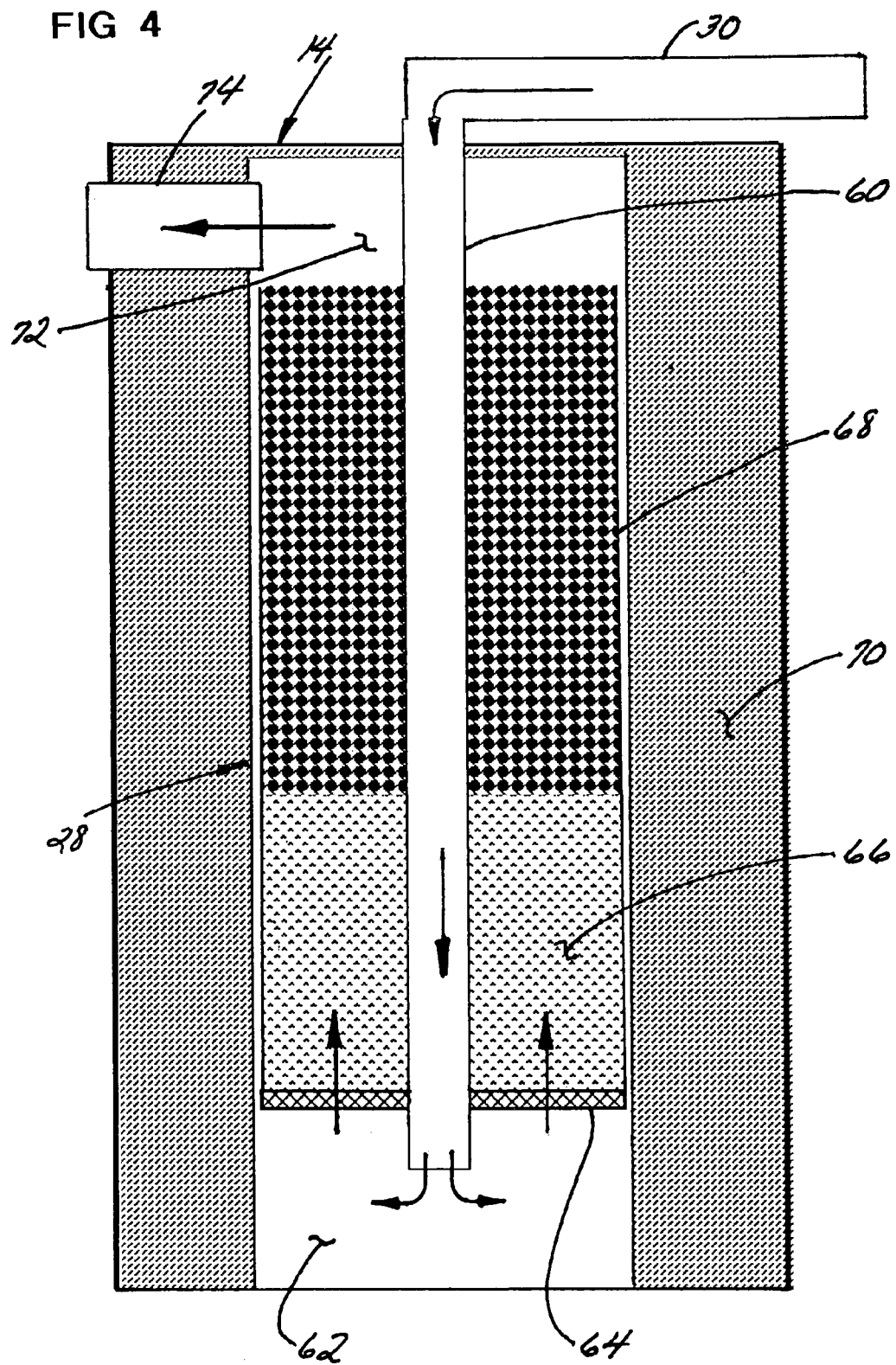
FIG. 4 is a longitudinal sectional view of the denitrification cell of FIG. 1.

Referring now to FIG. 4, the denitrification cell container 14 and the enclosed denitrification cell 28 receive partially treated water from the paired fluidized bed cell 24 through transfer tube 30. Water is received into the transfer tube 30 as it wells up through the biologically active media 40 previously described and exits from valve 56. This partially treated water is then forced downwardly under pressure through a central longitudinally extending water conduit 60 which coextends close to the bottom of the container 14 into a bottom cavity 62. The water is then upturned and forced to flow through a bottom screen 64 then upwardly in upwelling fashion through a bed of sulfur particles 66. Thereafter, the water flows through another calcium carbonate particles bed 68 to further buffer the water by pH adjustment. Although the calcium carbonate particles 68 may upwardly flow somewhat, the upper cavity 72 remains relatively clear as the calcium carbonate particles 68 do not exhibit the fluidized bed flotation similar to that described previously in cell 24.

Thereafter, the fully treated water exits from the cell 28 through an outlet tube 74. All of the outlet tubes 74 are interconnected with one of the collection conduits 32 or 34 while the treated water flows preferably into an aerator 36 for aeration-type dispersion back onto the surface of the lake or pond.

This paired cell arrangement wherein nitrogen is removed from the pond or lake water by the apparatus has also been designed with consideration for being maintenance free and versatility is also expanded by incorporation into a fountain or aeration system. Moreover, UV light sterilization for bacteria reduction and carbon filtration for chemical pollution reduction may easily be incorporated into the design just prior to, or in lieu of, the aeration step shown in FIG. 2.

Figure 5:
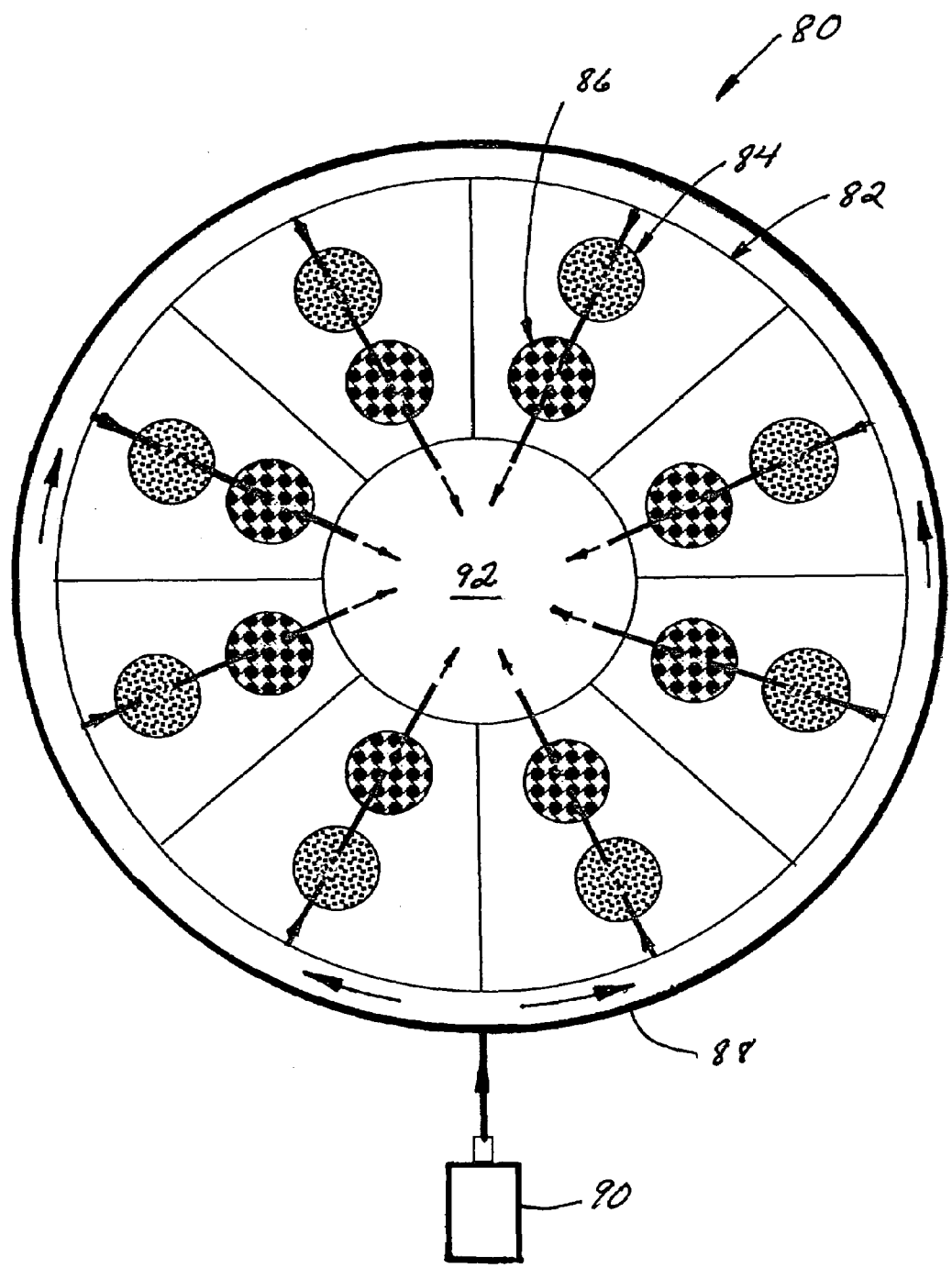
FIG. 5 is a top plan schematic view of an alternate embodiment of the invention.

As seen in FIG. 5, an alternate embodiment is there shown generally at numeral 80 in the form of a circular array of cell pairs 84 and 86 which function as previously described. Pond water is received from pump 90 into the circular perimeter manifold 88 and the treated water exits toward the center of this apparatus 80 into an aerator for dispensing over the surface of the lake or pond.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A pond and lake water treatment apparatus comprising:
   a water pump in fluid communication between water in a pond or lake and a water distribution manifold for delivering the water under pressure into said manifold;
   a plurality of fluidized bed cells arranged in parallel each of which is of an upwelling type having a central longitudinally extending first water conduit in fluid communication at an upper end thereof with said manifold;
   each of said fluidized bed cells containing a biologically active media, the water entering a bottom of said fluidized bed cell through said first water conduit and being directed upwardly through said biologically active media for discharge from said fluidized bed cell through a first discharge port;
   a plurality of denitrification cells each of which is paired with one said fluidized bed cell, each of said denitrification cells being of an upwelling type having a central longitudinally extending second water conduit in fluid communication at an upper end thereof with a corresponding discharge port of the paired said fluidized bed cell;
   each of said denitrification cells containing nitrate removing media, the water entering a bottom of said denitrification cell through said second water conduit from the paired said fluidized bed cell, the water being directed upwardly through said nitrate removing media for discharge from said denitrification cell back into the pond or lake through a second discharge port.

2. The apparatus of claim 1, wherein each of said cells further comprises:
   flotation material surrounding each of said cells in an amount sufficient for said apparatus to be buoyant in water.

3. The apparatus of claim 1, wherein:
   said apparatus is buoyant in water.

4. The apparatus of claim 1, wherein:
   said apparatus is submersible and operates in water.

5. The apparatus of claim 1, further comprising:
   a backflow check valve in said manifold for substantially preventing water and media from flowing backward in said manifold;
   a water flow control valve between said first and second cells for adjustably limiting the amount of water.

6. The apparatus of claim 1, wherein:
   said biologically active media is selected from the group consisting of sand, plastic beads and glass beads.

7. The apparatus of claim 1, wherein:
   said media which removes nitrates from the water is sulfur particles.

8. The apparatus of claim 1, wherein:
   each said first cells also containing a layer of calcium carbonate particles positioned between a porous screen and said biologically active media, said calcium carbonate particles buffering water entering said first cell before flowing into said biologically active media;
   each of said second cells also containing a layer of calcium carbonate particles positioned downstream of said nitrate removing media, said calcium carbonate particles further buffering the water.

9. A fluidized bed-type water filtering apparatus comprising:
   a water pump in fluid communication between water in a pond or lake and a water distribution manifold for delivering water under pressure into said manifold;
   a plurality of pairs of first and second upwelling-type water filtration cells arranged in parallel each of which includes a central longitudinally extending water conduit, a first said water conduit in said first cell being in fluid communication at an upper end thereof with said manifold;
   each of said first cells also being a fluidized bed-type containing a biologically active media, water entering a bottom of said first cell through said first water conduit being directed upwardly through said biologically active media for discharge from a first discharge port near a top of said first cell;
   a second said water conduit in each of said second cells in fluid communication at an upper end thereof with a corresponding discharge port of said first cell;
   each of said second cells containing a media for removal of nitrates from the water entering a bottom thereof through said second water conduit from the paired said first cell, the water being directed upwardly through said nitrate removing media for discharge from said second cell.

10. The apparatus of claim 9, wherein each of said cells further comprises:
    flotation material surrounding each of said cells in an amount sufficient for said apparatus to be buoyant in water.

11. The apparatus of claim 9, wherein:
    said apparatus is buoyant in water.

12. The apparatus of claim 9, wherein:
    said apparatus is submersible and operates in water.

13. The apparatus of claim 9, further comprising:
    a backflow check valve in said manifold for substantially preventing water and media from flowing backward in said manifold;
    a water flow control valve between said first and second cells for adjustably limiting the amount of water.

14. The apparatus of claim 9, wherein:
    said biologically active media is selected from the group consisting of sand, plastic beads and glass beads.

15. The apparatus of claim 9, wherein:
    said media which removes nitrates from the water is sulfur particles.

16. The apparatus of claim 9, wherein:
    each said first cells also containing a layer of calcium carbonate particles positioned between a porous screen and said biologically active media, said calcium carbonate particles buffering water entering said first cell before flowing into said biologically active media;
    each of said second cells also containing a layer of calcium carbonate particles positioned downstream of said nitrate removing media, said calcium carbonate particles further buffering the water.

17. A submerged or floating water denitrogenizing apparatus comprising:
    a water pump in fluid communication between water containing nitrogen and a water distribution manifold, said pump delivery the water under pressure into said manifold;
    a plurality of water filtration cell pairs each cell arranged in parallel of which is of an upwelling type having a central longitudinally extending water conduit in fluid communication between an upper and a lower end within each of said cells;
    a first one of said cells of each of said cell pairs being a fluidized bed-type filled with a biologically active media, the water entering a bottom of said first cell through a first of said water conduits upwelling through said biologically active media for discharge from said first cell through a first discharge port at or near a top of said first cell;

a second one of said cells of each of said cell pairs having a second of said water conduits therein in fluid communication at an upper end thereof with a corresponding discharge port of the paired said first cell;

each of said second cells containing a media which removes nitrates from the water entering a bottom of said second cell through said water conduit therein from the paired said first cell, the water being directed to upwell through said nitrate removing media for discharge from said second cell through a second discharge port.

18. The apparatus of claim 17, wherein each of said cells further comprises:

flotation material surrounding each of said cells in an amount sufficient for said apparatus to be buoyant in water.

19. The apparatus of claim 17, wherein:

said apparatus is buoyant in water.

20. The apparatus of claim 17, wherein:

said apparatus is submersible and operates in water.

21. The apparatus of claim 17, further comprising:

a backflow check valve in said manifold for substantially preventing water and media from flowing backward in said manifold;

a water flow control valve between said first and second cells for adjustably limiting the amount of water.

22. The apparatus of claim 17, wherein:

said biologically active media is selected from the group consisting of sand, plastic beads and glass beads.

23. The apparatus of claim 17, wherein:

said media which removes nitrates from the water is sulfur particles.

24. The apparatus of claim 17, wherein:

each said first cells also containing a layer of calcium carbonate particles positioned between a porous screen and said biologically active media, said calcium carbonate particles buffering water entering said first cell before flowing into said biologically active media;

each of said second cells also containing a layer of calcium carbonate particles positioned downstream of said nitrate removing media, said calcium carbonate particles further buffering the water.

* * * * *

UNITED STATES PATENT AND TRADEMARK OFFICE
CERTIFICATE OF CORRECTION

| | |
|---|---|
| PATENT NO. | : 7,666,302 B2 |
| APPLICATION NO. | : 12/217561 |
| DATED | : February 23, 2010 |
| INVENTOR(S) | : David W. Jenkins |

Page 1 of 1

It is certified that error appears in the above-identified patent and that said Letters Patent is hereby corrected as shown below:

Claim 17, col. 6, line 59, "arranged in parallel" should be deleted after the word "cell" and inserted after the word "pairs"

Signed and Sealed this

Thirtieth Day of March, 2010

David J. Kappos
*Director of the United States Patent and Trademark Office*